(12) United States Patent
Dolas et al.

(10) Patent No.: US 10,356,167 B1
(45) Date of Patent: Jul. 16, 2019

(54) WORKLOAD PROFILING

(71) Applicant: Hortonworks, Inc., Santa Clara, CA (US)

(72) Inventors: Sheetal Dinkar Dolas, Sunnyvale, CA (US); Paul Daniel Codding, Richfield, MN (US)

(73) Assignee: Hortonworks, Inc., Santa Clara, CA (US)

( * ) Notice: Subject to any disclaimer, the term of this patent is extended or adjusted under 35 U.S.C. 154(b) by 0 days.

(21) Appl. No.: 15/003,712

(22) Filed: Jan. 21, 2016

Related U.S. Application Data

(60) Provisional application No. 62/173,311, filed on Jun. 9, 2015.

(51) Int. Cl.
*G06F 15/173* (2006.01)
*H04L 29/08* (2006.01)

(52) U.S. Cl.
CPC ...... *H04L 67/1034* (2013.01); *H04L 67/1097* (2013.01)

(58) Field of Classification Search
CPC . H04L 67/1034; H04L 67/1097; H04L 67/10; G06F 9/5066; G06F 17/30194; G06F 9/4881; G06F 9/5027; G06F 11/3447; G06F 17/30598; G06F 3/0656; G06F 3/04847; G06F 11/3433; G06F 2201/88; G06F 2209/501

(Continued)

(56) References Cited

U.S. PATENT DOCUMENTS 9,766,996 B1\* 9/2017 Cao ..................... G06F 11/3447
2010/0122065 A1\* 5/2010 Dean ................. G06F 17/30445
712/203

(Continued)

OTHER PUBLICATIONS

S. Papadimitriou and J. Sun, "DisCo: Distributed Co-clustering with Map-Reduce: A Case Study towards Petabyte-Scale End-to-End Mining," 2008 Eighth IEEE International Conference on Data Mining, Pisa, 2008, pp. 512-521.\*

(Continued)

*Primary Examiner* — Taylor A Elfervig
(74) *Attorney, Agent, or Firm* — Fish & Richardson P.C.

(57) ABSTRACT

Methods, systems, and apparatus, including computer programs encoded on computer storage media, for profiling and configuring work on a cluster of computer nodes. One method includes a component controller designating running software components according to a component configuration, to operate on respective nodes within the cluster to process a workload; determining, for each component, current and historical quantities of resources used by the component when processing previous workloads; computing, for each workload operation, execution metrics that indicate resources used in nodes by the one or more components included in the workload operation; and generating one or more modified parameter values for the component configuration of a particular component or for the workload or for both, the component configuration and workload with the modified parameter values specifying a more optimum use of resources at the nodes in the cluster than the component configuration and workload without the modified parameter values.

30 Claims, 3 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 2013/0339966 | A1* | 12/2013 | Meng .................... | G06F 9/5061 718/102 |
| 2014/0215487 | A1* | 7/2014 | Cherkasova .......... | G06F 9/5083 718/106 |
| 2014/0304407 | A1* | 10/2014 | Moon .................... | H04L 43/045 709/224 |
| 2015/0058843 | A1* | 2/2015 | Holler .................... | G06F 9/455 718/1 |
| 2016/0300142 | A1* | 10/2016 | Feller ..................... | G06N 5/04 |

OTHER PUBLICATIONS

K. Kc and K. Anyanwu, "Scheduling Hadoop Jobs to Meet Deadlines," Cloud Computing Technology and Science (CloudCom), 2010 IEEE Second International Conference on, Indianapolis, IN, 2010, pp. 388-392.*

H. Herodotou, "Hadoop Performance Models", Dec. 2011, Duke University Technical Report, Distributed, Parallel, and Cluster Computing, p. 1-16.*

Condie, Tyson, et al. "Online aggregation and continuous query support in mapreduce." Proceedings of the 2010 ACM SIGMOD International Conference on Management of data. ACM, 2010.*

Vernica, Rares, et al. "Adaptive MapReduce using situation-aware mappers." Proceedings of the 15th International Conference on Extending Database Technology. ACM, 2012.*

Wang, Xiao Wei, et al. "Dynamic split model of resource utilization in mapreduce." Proceedings of the second international workshop on Data intensive computing in the clouds. ACM, 2011.*

Chen, Yanpei, Archana Ganapathi, and Randy H. Katz. "To compress or not to compress-compute vs. io tradeoffs for mapreduce energy efficiency." Proceedings of the first ACM SIGCOMM workshop on Green networking. ACM, 2010.*

Tian, Chao, et al. "A dynamic mapreduce scheduler for heterogeneous workloads." 2009 Eighth International Conference on Grid and Cooperative Computing. IEEE, 2009.*

Yang et al., "MapReduce Workload Modeling with Statistical Approach", 2012, Journal of Grid Computing, Jun. 2012, vol. 10, Issue 2, pp. 279-310 (Year: 2012).*

A. Ganapathi, Y. Chen, A. Fox, R. Katz and D. Patterson, "Statistics-driven workload modeling for the Cloud," 2010 IEEE 26th International Conference on Data Engineering Workshops (ICDEW 2010), Long Beach, CA, 2010, pp. 87-92. (Year: 2010).*

Z. Ren, X. Xu, J. Wan, W. Shi and M. Zhou, "Workload characterization on a production Hadoop cluster: A case study on Taobao," 2012 IEEE International Symposium on Workload Characterization (IISWC), La Jolla, CA, 2012, pp. 3-13. (Year: 2012).*

C. Tian, H. Zhou, Y. He and L. Zha, "A Dynamic MapReduce Scheduler for Heterogeneous Workloads," 2009 Eighth International Conference on Grid and Cooperative Computing, Lanzhou, Gansu, 2009, pp. 218-224. (Year: 2009).*

Herodotou et al., "Starfish: A Self-tuning System for Big Data Analytics,"5th Biennial Conference on Innovative Data Systems Research, Jan. 2011, 12 pages.

\* cited by examiner

WORKLOAD PROFILING

RELATED CASES

This application claims benefit of U.S. Provisional Appl. No. 62/173,311, filed Jun. 9, 2015, which is herein incorporated by reference in its entirety.

BACKGROUND

This specification relates to workload profiling in a computer cluster.

A distributed computing framework, e.g., Apache Hadoop, can be deployed to manage distributed storage and distributed processing of large data sets on clusters of many computers which may be physical or virtual. One computer is referred to as a node. The framework includes multiple components that can be run on different nodes in the cluster. Each component is responsible for a different task. For example, a first component, e.g., Hadoop Distributed File System (HDFS), can implement a file system, and a second component, e.g., Hive, can implement a database access layer. The components work together to distribute processing of a workload among nodes in the cluster.

A cluster of computers running the distributed computing framework is generally highly scalable. Additional nodes can be added to the cluster to increase throughput. Each cluster is also highly resistant to failure because data can be copied to multiple nodes in the cluster in case one or more nodes fail.

SUMMARY

In general, this specification describes a system for workload profiling in a computer cluster.

In general, one innovative aspect of the subject matter described in this specification can be embodied in methods that include the actions of a component controller designating running software components according to a component configuration, to operate on respective nodes within the cluster to process a workload; determining, for each component, current and historical quantities of resources used by the component when processing previous workloads; computing, for each workload operation, execution metrics that indicate resources used in nodes by the one or more components included in the workload operation; and generating one or more modified parameter values for the component configuration of a particular component or for the workload or for both, the component configuration and workload with the modified parameter values specifying a more optimum use of resources at the nodes in the cluster than the component configuration and workload without the modified parameter values.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. A workload profiling system can automatically profile previous workloads processed by a cluster to identify optimizations for processing future workloads by the cluster. The optimizations can specify how to modify parameters that specify execution of workloads in a way that maximizes resource usage and increases throughput. Therefore, even inexperienced administrators of the cluster can operate a cluster with maximum efficiency.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
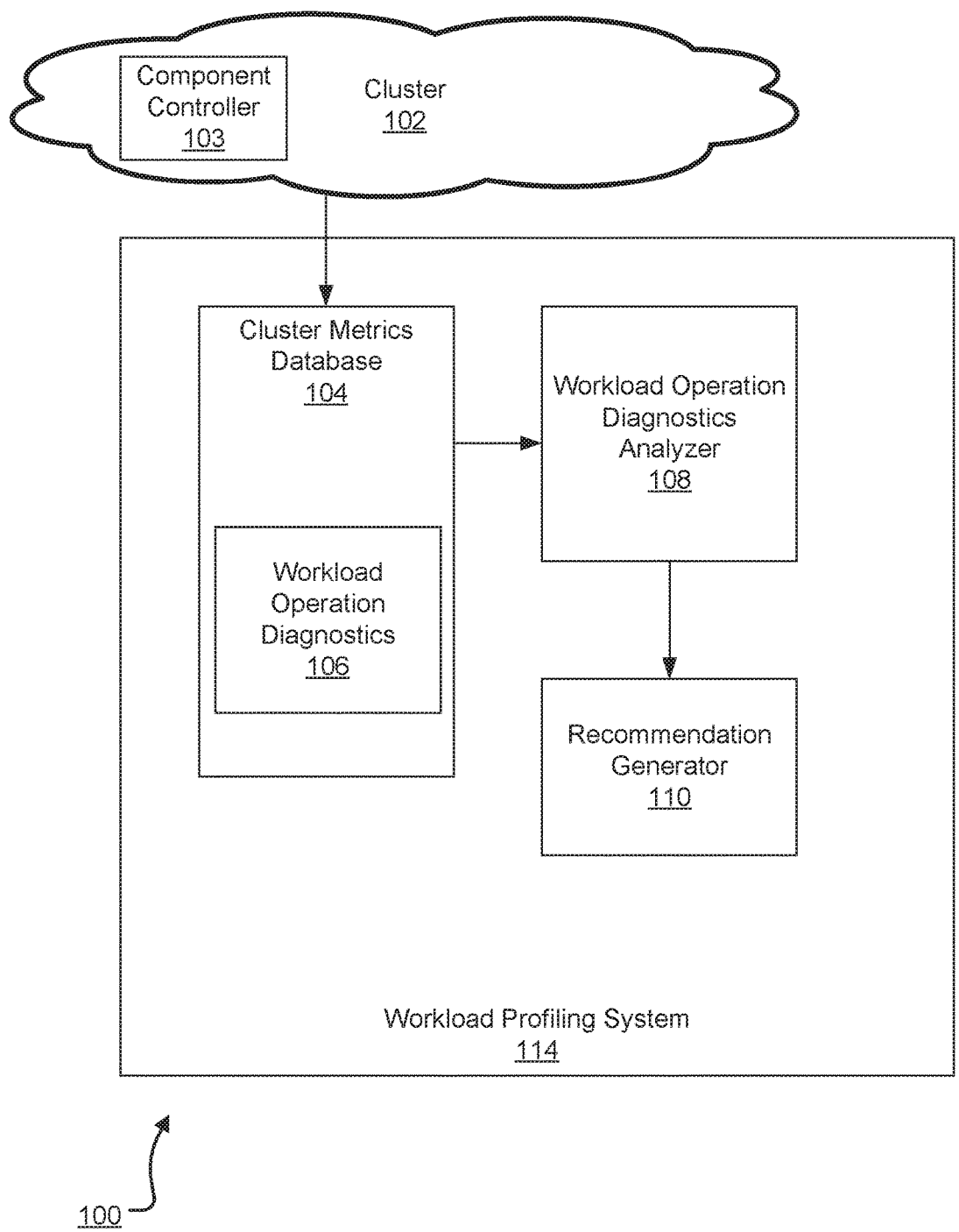
FIG. 1 shows an example system for workload profiling in a computer cluster.

FIG. 1 shows an example architecture 100 for a workload profiling system 114 for a computer cluster 102. The computer cluster 102 includes multiple computers at one or more locations. One computer, whether physical or virtual, is referred to as a node. Each physical computer can be coupled to the cluster 102 through a data communication network, e.g., local area network (LAN) or wide area network (WAN), e.g., the Internet, or a combination of networks. In some implementations, the system is coupled to multiple other clusters.

The nodes in the cluster 102 can each run one or more components of a distributed computing framework, e.g., a Hadoop framework, for processing a large workload. The distributed computing framework enables distributed storage and processing of large data sets. The one or more components will be described with reference to FIG. 2.

A component controller 103 in the cluster 102 can designate which components operate on which nodes in the cluster. Each component can be associated with a respective component configuration that specifies, through multiple parameters, how the component should process portions of the workload. The component configuration can be stored in or as a file, in a database, or as part of a workload request or operation, for example. By way of illustration, the parameters in the component configuration can specify Internet Protocol (IP) addresses of nodes at which the component should run. The parameters can also specify a respective quantity the component may use of at least the following resources at a node: storage, processing power, memory, and network and disk input and output operations. Modifying the parameters, therefore, can significantly change how the workload is processed.

By way of illustration, one of the components can be a resource manager. The resource manager is a component of the framework that manages compute and memory resources in the cluster. A component configuration for the resource manager can specify, for example, a parameter that establishes a size of the workload at a particular node to process. Other parameters of the component configuration can specify a time or rate to start processing a portion of the workload. Additional parameters will be described with reference to FIG. 3.

The cluster 102 in operation processes a workload specified by a workload specification that specifies execution of multiple associated workload operations to process the workload. The workload specification can include optional parameters used to dictate how the workload is processed. The workload specification can be stored in or as a file, in a database, or as part of workload request or workload operation. The workload specification can represent the workload as multiple workload operations to be processed. An example of a workload operation is a job.

The workload specification can include multiple parameters. The multiple parameters can specify, for each workload operation in the workload, one or more components that perform one or more tasks for the workload operation, e.g., one or more map tasks and one or more reduce tasks for the workload operation. A map task can assign portions of the workload to nodes in the cluster for parallel processing to generate mapped outputs. A reduce task can process the mapped outputs to generate a workload operation output. The cluster components can aggregate the workload operation outputs into a result that is provided to a user.

While each workload operation specified in the workload specification is being executed, or afterwards, statistics and characteristics of the execution of the workload operation can be stored as workload operation diagnostics 106 in a cluster metrics database 104. The statistics and characteristics will be described with reference to FIGS. 2 and 3. The statistics and characteristics can include how many input and output records were read and written for each workload operation, a time of completion for each workload operation, how many nodes were used in processing the workload operation, and so on.

Generally, workloads dynamically change over time. That is, the cluster 102 can have a workload to process that is larger over one period of time but smaller workload over a later period of time. In some cases, processing a workload includes distributing the computation and storage of the workload to some nodes of the cluster. The distributed computation and storage can also be managed by components in the distributed computing framework.

Each of the one or more components running on the cluster can produce metrics data that represent measurements of some properties of the component, which will be described with reference to FIG. 2. The metrics data can be produced on a per node basis, a per cluster basis, per workload operation basis, or any combination of the above. The metrics data can also be measured over a time interval, e.g., daily, weekly, or monthly, which interval can be set or changed by an administrative user.

The components running on cluster 102 can also produce metrics data from hardware profiles of nodes in the cluster. For example, the components running on cluster 102 can produce metrics data for a number of nodes in the cluster 102 at a particular point in time or over a period of time.

Each node in the cluster, irrespective of the components running on the node, can also produce metrics data. By way of illustration, the metrics data from a hardware profile for a particular node can include a number of processors in the node, trending processor usage patterns over a time period, a number and type of disk devices in the node, e.g., Solid State Drive versus Hard Disk Drive, trending disk throughput/utilization over a period of time, trending network throughput/utilization over a period of time, an amount of physical memory, or trending memory usage over a period of time.

The cluster components 102 store the metrics data in a cluster metrics database 104. The metrics data can be stored regularly over a scheduled time interval, e.g., every day or every week. The cluster 102 can also store the workload operation diagnostics 106 in the cluster metrics database 104. Alternatively, the workload profiling system 114 can gather the metrics data and the workload operation diagnostics 106 from the cluster 102.

A workload operation diagnostics analyzer 108 reads the metrics data and the workload operation diagnostics 106 from the cluster metrics database 104 to determine a current and historical usage of the cluster. Determining the current and historical usage will be described with reference to FIGS. 2 and 3.

A recommendation generator 110 uses the current and historical usage from the workload operation diagnostics analyzer 108 to generate modified parameters for the workload specification, any particular component configuration, or both. The modified parameters will be described with reference to FIG. 3. In some implementations, the recommendation generator 110 generates instructions that improve performance of the cluster, workload, or associated workload operations. The instructions can be hardware-related: for example, the instruction can be to alter the configuration of a network card to achieve a higher throughput, or to format a disk in a particular way.

In some implementations, the recommendation generator 110 generates a report including the modified parameters or the instructions and provides the report to a user. The recommendation generator 110 includes a rules engine 112 and uses it to determine values for the modified parameters or the instruction. In particular, the rules engine 112 includes multiple rules, which can be added or removed, e.g., by an administrator. The rules specify threshold values or ranges and the modifications to the parameters that the recommendation generator 110 should generate if the threshold values or ranges are not satisfied. A modification may be to a specific value or it may be a relative change from a current value. The size of a modification may depend on how much the corresponding cluster performance deviates from the threshold values or ranges. If the threshold values or ranges are not satisfied by the cluster, the recommendation generator 110 generates, according to the rules, modified parameters under which the cluster would be more likely to operate in such a way that the threshold values or ranges to be satisfied. This will be described with reference to FIG. 3. The rules can be managed by the rules engine 112 dynamically through a user interface.

The report can be a recommendation for an administrative user to modify current parameters of the cluster to the modified parameters. For example, the recommendation generator 110 can provide the modified parameters for display at a user interface associated with the workload profiling system 114. The user can apply or reject, through the user interface, modifications to parameters in any workload or component configurations according to the modified parameters, which can cause the cluster to process future workloads with the modified parameters.

Figure 2:
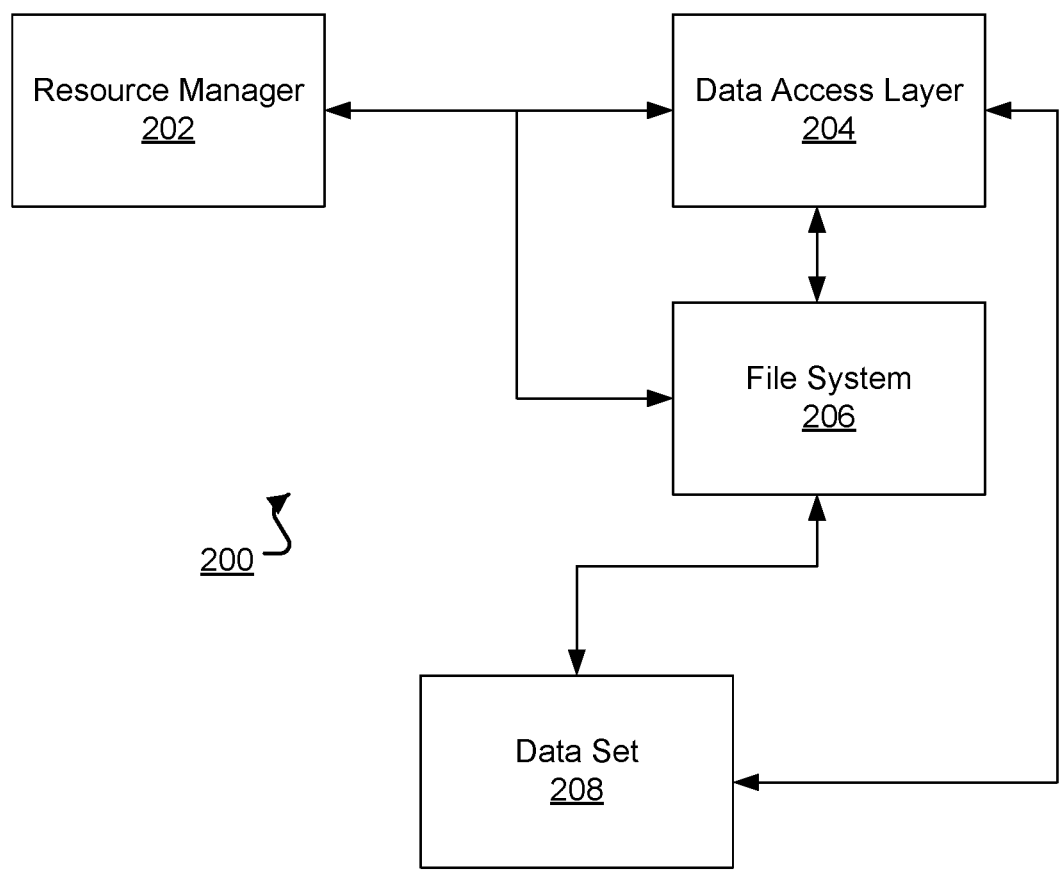
FIG. 2 shows example components running on the cluster to process a workload.

FIG. 2 shows example components of a framework, e.g., the Hadoop framework, running on the cluster to process a workload. Each component can operate on one or more nodes of the cluster. Each component plays a different role in processing a given workload. Each role generally has a different pattern of resource utilization, and therefore each component may use different amounts of resources of the one or more nodes on which the component runs.

By way of illustration, the workload can include a data set 208 to process. The data set 208 can be structured data or unstructured data or both. In some cases, the data set 208 is accessible by components in the cluster. A file system 206 can structure and store portions of the structured data set 208 for processing. The file system 206 can also provide portions of the data set 208 to a database access layer 204, which can expose the data set 208 for user or computer access. Either the file system 206 or the database access layer 204 can access the data set 208 directly. A resource manager 202 can communicate with the database access layer 204 and the file system 206 to distribute the processing of the data set 208 by the components to other nodes in the cluster if necessary.

Each component executes actions for processing the workload, and produces metrics data that represent resources used by the component. For example, the file system 206 can produce metrics data of a total usage amount, e.g., how much disk space is being used, a count of transactions, a replication factor, e.g., how many times data should be replicated for redundancy purposes, a count of files, directories, and blocks in existence, a count of snapshots, a count of both disk and network input/output (I/O) operations, or a size of data transfer for the I/O operations on average or over a period of time.

The resource manager 202 can produce metrics data of a total count of workload operations executed over a period of time, a total count of containers in existence, a total amount or percentage of processing consumed by all running workload operations, or an amount of memory blocked or consumed by all running workload operations.

The data access layer 204 can access a database storage component, e.g., HBase, that produces metrics data of a count of tables in existence in the database. For each table, the metrics data can include a count of regions used, a count of operations over a period of time, or an average operation latency over a period of time.

The metrics data of each component can include measures of the amount of resources used by the one or more nodes running the component. That is, the metrics data of each component can be quantified into four types of resources used at the component for a particular workload: 1) storage, 2) processing power, 3) memory, 4) disk I/O operations, and 5) network I/O operations.

Therefore, the current workload processed by the cluster can be represented in terms of the five resources utilized, either on a per component basis, a per cluster basis, or a per workload operation basis. The representations can be stored in a cluster metrics database, e.g., the cluster metrics database 104 of FIG. 1, over regular intervals, e.g., daily, weekly, monthly, or yearly, which interval can be set or changed by an administrative user.

Figure 3:
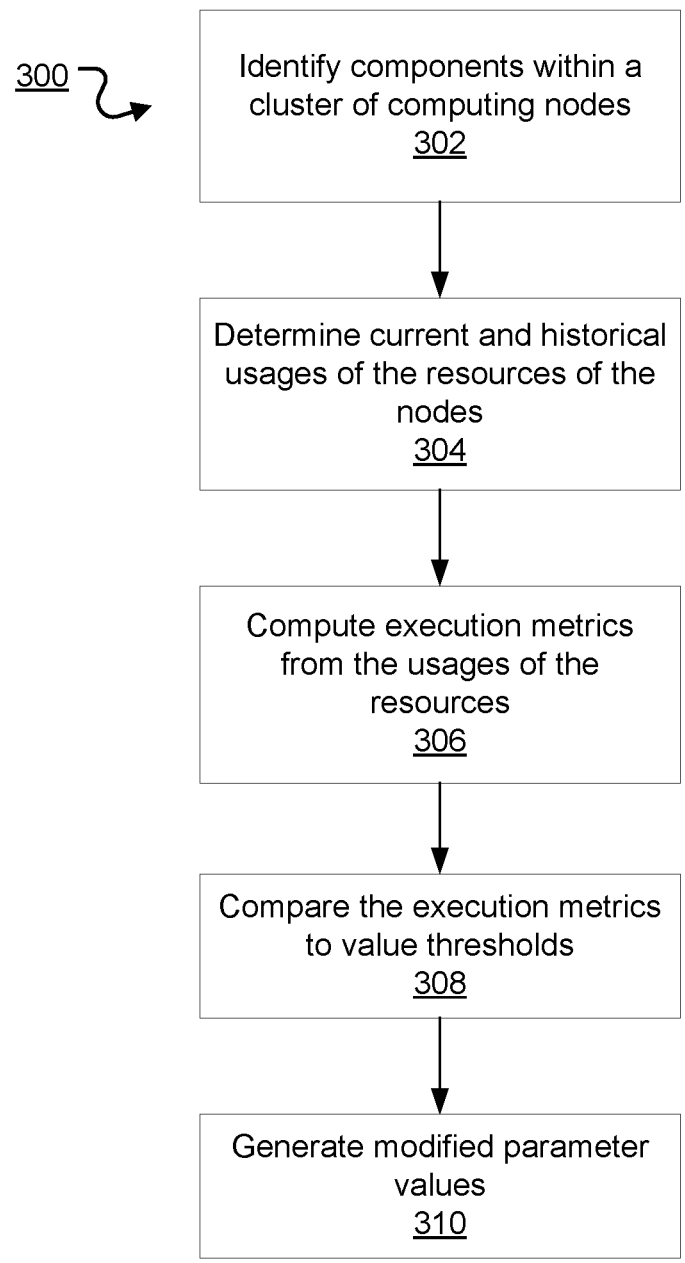
FIG. 3 is a flow diagram of an example method for profiling workloads at a cluster.

FIG. 3 is a flow diagram of an example method 300 for profiling workloads at a cluster. For convenience, the method 300 will be described with respect to a system, e.g., the workload profiling system 114 of FIG. 1, having one or more computing devices that execute software to implement the method 300.

The system identifies components deployed on a cluster of computing nodes (step 302). Some clusters have a first set of components installed in the nodes, e.g., HDFS and HBase, while other clusters have a second unique set of components installed, e.g., Hive, HDFS, and Yet Another Resource Negotiator (YARN). Each cluster can maintain, using parameters in component configurations, a list of active nodes and components installed in each node of the cluster. The system can identify the components of any given cluster from the component configurations of the cluster.

The system determines, for each component, current and historical usages of the resources of the nodes running the component (step 304). In some implementations, the system retrieves current and historical usages for each component from a cluster metrics database, e.g., the cluster metrics database 104 of FIG. 1. In some implementations, as described above, the current and historical usages are represented by the following types of resources: 1) storage, 2) processing power, 3) memory, and 4) disk I/O operations, and 5) network I/O operations. The current and historical usages span a duration of time, e.g., the previous 6 to 12 months. In some implementations, the cluster associates respective current and historical usages for each workload operation executing at the cluster.

Based on the associations, the system computes, for each workload operation, execution metrics from the current and historical quantities of resources used by each component in processing the workload operation (step 306). The execution metrics are computed for the map and reduce tasks, for example, of each workload operation and also the workload operation itself. Execution metrics can also be computed for each component or node in the cluster, which will be described below. The execution metrics indicate resources used in nodes by the one or more components included in the workload operation. The execution metrics can be measured for each of the types of resources used in nodes by the one or more components performing the workload operation, which will be described below.

Each execution metric can be associated with a respective value threshold. Value thresholds can be single numbers or ranges of numbers. The value thresholds can be determined by a rules engine, e.g., the rules engine 112 of FIG. 1. The association between the value thresholds and the execution metrics can be stored in the rules themselves if static thresholds are used. Otherwise, threshold values can be calculated within the rules based on the current and other execution metrics. These threshold values are used during the rules evaluation process by the rules engine to determine if the current metric in question has a value outside of that threshold. Generally, some threshold values are static and others are calculated. The rules engine can be managed by an administrator. The administrator can analyze current metrics and provide guidance as to the proper value thresholds.

The system compares the execution metrics to the respective value thresholds (step 308). Example comparisons with value thresholds will be described below.

Depending on the results of the comparing, the system generates one or more modified parameter values for the component configuration of a particular component, for a workload, or for both (step 310). By way of illustration, if a particular execution metric is greater than a respective value threshold, the system can generate a modified parameter such that the execution metric will be or should be less than or equal to the respective value threshold after a subsequent workload operation.

The component configuration and workload specification with the modified parameter values specify a more optimum use of resources at the nodes in the cluster than the component configuration and workload specification without the modified parameter values. The system can incorporate the modified parameters into the component configuration and workload specification in response to user approval, thereby causing the system to process future workloads with the modified parameters.

By way of illustration, one execution metric for a workload operation is a ratio of counts of input and output records for a reduce task of the workload operation. The counts can be obtained from the current and historical usage data, which as described in reference to FIG. 1, can be obtained from a the workload operation diagnostics. The ratio is an example execution metric.

If the system determines that the ratio is greater than a value threshold associated with the ratio, the system generates a parameter that causes a component controller of the cluster to add a combiner that reduces the number of records inputted to the reduce task of the particular workload operation. For example, the parameter can be a true Boolean flag to use a combiner to aggregate output from a map task and to provide the aggregated output as input to a reduce task. The component controller processes the parameter, which is stored in a component configuration, to add the combiner. Then, during the workload operation or on a subsequent workload operation, the combiner can aggregate outputs of map tasks to reduce data sent to the reduce task, thereby improving performance by minimizing data transfer.

If the system determines that the ratio is not greater than the value threshold, the system can refrain from generating modified parameters.

Another execution metric for a workload operation relates to a size of records outputted from each map task for the workload operation and a size of records outputted from each reduce task for the workload operation. The system can obtain the sizes from the current and historical usage data. If the size of records outputted from each map task or the size of records outputted from each reduce task is greater than a respective value threshold, the system generates a parameter that causes the component controller to compress the records outputted from the map task or the records outputted from the reduce task, thereby minimizing disk input and output operations.

Another execution metric relates to for a workload operation, a respective size of records inputted to each map task for the workload operation. If the respective size of records inputted to the respective map task for the workload operation is less than a respective value threshold, the system generates a parameter that causes the component controller to split the workload across a fewer number of map tasks. Alternatively, if the respective size of records inputted to the respective map task is greater than another associated value threshold, the system generates a parameter that causes the component controller to split the workload across a higher number of map tasks.

Another execution metric for a workload operation relates to a difference between start and end times. In particular, the system determines an end time of each map task for the workload operation and a start time of each reduce task for the workload operation. The system obtains, across multiple workload operations in the workload, a latest end time from the map tasks and an earliest start time from the reduce tasks. The system computes a difference between the earliest start time from the reduce tasks and the latest end time from the map tasks. If the difference is greater than a value threshold, the system generates a parameter that causes the component controller to configure the reduce tasks to start at a later time, thereby reducing blocking of cluster resources.

Another execution metric for a workload operation relates to ratios of a number of spilled records for map and reduce tasks of the workload operation to a number of output records for the map and reduce tasks. Spilled records are output records from a map or reduce task that are stored in an in-memory buffer, whereas output records for a task are generally stored on disk. Spilled records can undergo a spilling phase, where the output records stored in the in-memory buffer are merged and packaged into output records to be stored on disk.

The system determines, for each map and reduce task of the workload operation, a respective number of spilled records for the task and a respective number of output records for the task. The system computes, for each map and reduce task, a respective ratio of the respective number of spilled records for the task to the number of output records for the task. If any of the ratios are greater than a respective value threshold, the system generates a parameter that causes the particular workload operation to increase a respective spill buffer used in the respective task.

Another execution metric for a workload operation includes a ratio of a number of input records for a particular reduce task of the workload operation to an average number of input records to reduce tasks in the workload operation. The system can compute an average number of input records by dividing a total number of input records to reduce tasks in the workload operation with a number of reducers for the workload operation. A reducer can be a node in the cluster that is tasked, e.g., by a workload, with only performing a reduce task for a workload operation.

The system can compute the ratio of the number of input records for the particular reduce task of the workload operation to the average number of input records to reduce tasks in the workload operation. If the ratio is greater than a value threshold, the system generates a parameter that causes the component controller to normalize input records across each reduce task. That is, the parameter causes the component controller to distribute input records for the reduce task of the workload operation to other reducers for the workload operation, thereby reducing data skew.

Another execution metric for a workload operation relates to a ratio directed to task localization. Task localization attempts to ensure tasks for a particular workload operation are performed on nodes geographically local to each other and local to the dataset for the workload operation. This can reduce latency for transferring data across long distances.

The system determines, for each map task of the workload operation, a respective first node on which the map task of the workload operation is executed and a respective second node from which data for the map task was accessed. The system computes, across each map task in the workload operation, a first number of map tasks having the respective first node be the same as the respective second node. The system computes a ratio of the first number to a total number of map tasks across the workload operation. If the ratio is less than a value threshold, the system generates a parameter that causes the component controller to configure a scheduler to increase locality for the map tasks. Therefore, when balancing data across map tasks, the component controller can assign map tasks to particular nodes to ensure execution of the map task is on the same node from which data for the map task is accessed.

Another execution metric for a workload operation relates to a difference between start times and submission times for record processing. In particular, the system determines, for each task in the workload operation, a respective submission time and a respective start time. The system computes, for each task of a particular workload operation, a respective difference between a respective start time of the task and a respective submission time of the task. If any of the differences is greater than a value threshold, the system generates a parameter that causes the component controller to reduce a total number of tasks across the workload operation. That is, the component controller can spread the workload across a fewer number of tasks.

Another execution metric for a workload operation relates to a difference between resources blocked by a task in the workload operation and resources used by the task. The system determines, for each task, respective resources blocked by the task and respective resources used by the task. The system computes, for each task, a respective difference between the respective resources blocked by the task and the respective resources used by the task. If any of the differences is greater than a value threshold, the system generates a parameter that causes the component controller to lower the amount of resources requested by the particular workload operation.

The generated parameters thus far described affect a workload operation layer of the cluster and can be specified in a workload configuration or component configurations.

The system can also generate parameters affecting an operating system layer of the cluster. That is, the parameters can include modifications to kernel configuration, memory usage, processing usage, storage usage, network usage, and dependency usage of the one or more nodes in the cluster. By way of illustration, a workload profiling system can check for specific settings, which correspond to the parameters, enabled in specific versions of an operating system. If the setting is outside of a threshold range, the system can generate a recommendation to improve performance.

The system can also generate parameters affecting a storage layer of the cluster. For example, the parameters can include modifications to storage type or storage speed of the one or more nodes in the cluster. The system can also generate recommendations of instructions, which do not involve parameters. By way of illustration, if the storage type is a spinning disk instead of a solid-state drive, the system can recommend a type of drive configuration. The system can also recommend a mount option for a file system.

The system can also generate parameters affecting a processing layer of the cluster. For example, the parameters can include parameters affecting queue configurations, resource allocations, or container sizes and thresholds of the one or more nodes in the cluster.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. One or more non-transitory computer storage media encoded with computer program instructions that when executed by one or more computers cause the one or more computers to perform operations comprising:

identifying, by a component controller, a plurality of running software components deployed on a cluster of computing nodes, the component controller designating each component, according to a respective component configuration, to operate on one or more respective nodes within the cluster to process a workload specified by a workload specification, the plurality of running software components including two or more of a Hadoop Distributed File System, a Hive database access layer, an HBase database management system, or a YARN resource manager, wherein the workload specification specifies the workload as multiple workload operations to be processed, wherein the workload specification includes multiple parameters that specify, for each workload operation in the workload, one or more respective components that perform one or more respective tasks for the workload operation, and wherein for each component of the plurality of components, the respective component configuration comprises a respective plurality of parameters that specify a respective quantity the component may use to process the workload of at least the following resources of the one or more respective nodes: storage, processing power, memory, and network and disk input and output operations;

determining, for each identified component, current execution metrics and quantities of the resources being used by the component in processing the workload, and obtaining, from a database, historical execution metrics and quantities of the resources of the one or more respective nodes used by the component when processing previous workloads, wherein the historical execution metrics and quantities of resources comprise quantities and resources for each workload operation represented by the workload specification;

computing, for each workload operation specified by the workload specification, execution metrics for the workload operation from the current and historical quantities used by each component in performing the workload operation, wherein the execution metrics indicate resources used in nodes by the one or more components included in the workload operation;

updating, for each workload operation, execution metrics in the database;

comparing the current and historical execution metrics for the workload operations of the workload to respective value thresholds; and in response to the comparing, generating one or more modified parameter values for the component configuration of a particular component or for the workload specification or for both, the component configuration and workload with the modified parameter values specifying a more optimum use of resources when performing the workload represented by the workload specification at the nodes in the cluster than when performing the workload represented by the workload specification according to the component configuration and workload specification without the modified parameter values.

2. The one or more non-transitory computer storage media of claim 1, wherein each workload operation specifies one or more components that perform at least one map task and at least one reduce task, wherein the map task assigns portions of the workload to respective nodes in the cluster for parallel processing to generate respective mapped outputs, and wherein the reduce task processes the respective mapped outputs to generate a workload operation output.

3. The one or more non-transitory computer storage media of claim 2, the operations comprising:

for each reduce task of a particular workload operation:
determining from the current and historical execution metrics a number of records inputted to the reduce task of the workload operation and a number of records outputted from the reduce task of the workload operation;
computing a ratio of the number of records inputted to the reduce task of the workload operation to the number of records outputted from the reduce task of the particular workload operation;
determining that the ratio is greater than a value threshold; and
in response to determining that the ratio is greater than the value threshold, generating a modified parameter value that causes the component controller to add a combiner that reduces the number of records inputted to the reduce task of the particular workload operation.

4. The one or more non-transitory computer storage media of claim 2, the operations comprising:
for a particular workload operation:
determining from the current and historical execution metrics a size of records outputted from each map task and a size of records outputted from each reduce task;
determining, for each task, that the respective size of records outputted from the task is greater than a respective value threshold; and
in response to determining that the respective size of records is greater than the respective value threshold, generating, for the particular workload operation, a modified parameter value that causes the component controller to compress the records outputted from each task.

5. The one or more non-transitory computer storage media of claim 2, the operations comprising:
for a particular workload operation:
determining from the current and historical execution metrics a respective size of records inputted to each map task of the workload operation;
determining, for each map task, that the respective size of records inputted to the map task for the workload operation is less than a respective value threshold; and
in response to determining that the respective size of records is less than the respective value threshold, generating a modified parameter value that causes the component controller to split the workload across a fewer number of map tasks.

6. The one or more non-transitory computer storage media of claim 2, the operations comprising:
for a particular workload operation that includes multiple map tasks producing mapped outputs processed by multiple reduce tasks of the particular workload operation:
determining from the current and historical execution metrics an end time of each map task of the workload operation and a start time of each reduce task of the workload operation;
obtaining a latest end time from the map tasks;
obtaining an earliest start time from the reduce tasks;
determining that a difference between the earliest start time from the reduce tasks and the latest end time from the map tasks is greater than a value threshold; and
in response to determining that the difference is greater than the value threshold, generating a modified parameter value that causes the component controller to configure the reduce tasks of the workload operation to start at a later time.

7. The one or more non-transitory computer storage media of claim 2, the operations comprising:
for a particular workload operation:
determining from the current and historical execution metrics, for each map and each reduce task of the workload operation, a number of spilled records for the task and a number of output records for the task;
determining, for one or more tasks, that a ratio of the respective number of spilled records for the task to the number of output records for the task is greater than a respective value threshold; and
in response to determining that the ratio is greater than the respective value threshold, generating a modified parameter value that causes the particular workload operation to increase a respective spill buffer used in the task.

8. The one or more non-transitory computer storage media of claim 2, the operations comprising:
for a reduce task of a particular workload operation:
determining from the current and historical execution metrics a number of input records for the reduce task of the workload operation;
computing an average number of input records for each reduce task in the workload operation;
determining that a ratio of the number of input records for the reduce tasks to the average number of input records for each reduce tasks is greater than a value threshold; and
in response to determining that the ratio is greater than the value threshold, generating a modified parameter value that causes the component controller to normalize input records across each reduce task.

9. The one or more non-transitory computer storage media of claim 2, the operations comprising:
for a particular workload operation:
determining from the current and historical execution metrics, for each map task of the workload operation, a respective first host on which the map task of the workload operation is executed and a respective second host from which data for the map task was accessed;
computing, across the map tasks, a first number of map tasks having the respective first host being the same as the respective second host;
determining that a ratio of the first number to a total number of map tasks for the workload operation is less than a value threshold; and
in response to determining that the ratio is less than the value threshold, generating a modified parameter value that causes the component controller to configure a scheduler to increase locality for the map tasks.

10. The one or more non-transitory computer storage media of claim 2, the operations comprising:
for a particular workload operation:
determining from the current and historical execution metrics, for each map task and each reduce task in the workload operation, a respective submission time and a respective start time;
determining, for one or more tasks, that a respective difference between a respective start time of the task and a respective submission time of the task is greater than a value threshold; and
in response to determining that the respective different is greater than the value threshold, generating a modified parameter value that causes the component controller to reduce a total number of tasks in the workload operation.

11. The one or more non-transitory computer storage media of claim 2, the operations comprising:
for a particular workload operation:
determining from the current and historical execution metrics, for each map task and each reduce task, respective resources blocked by the task and respective resources used by the task;
determining, for each map task or each reduce task, that a respective difference between the respective resources blocked by the task and the respective resources used by the task is greater than a value threshold; and
in response to determining that the respective difference is greater than the value threshold, generating a modified parameter value that causes the component controller to lower an amount of resources requested by the particular workload operation.

12. The one or more non-transitory computer storage media of claim 2, wherein the modified parameter values affect an operating system layer of the cluster, the modified parameter values comprising values of parameters affecting kernel configuration, memory usage, processing usage, storage usage, network usage, or dependency usage of the one or more nodes in the cluster.

13. The one or more non-transitory computer storage media of claim 2, wherein the modified parameter values affect a storage layer of the cluster, the modified parameter values comprising values of parameters affecting storage type or storage speed of the one or more nodes in the cluster.

14. The one or more non-transitory computer storage media of claim 2, wherein the modified parameters affect a processing layer of the cluster, the modified parameter values comprising values of parameters affecting queue configurations, resource allocations, or container sizes and thresholds of the one or more nodes in the cluster.

15. The one or more non-transitory computer storage media of claim 1, wherein the value thresholds are established by a rules engine, wherein the rules engine is configured to manage, through a user interface, value thresholds corresponding to execution metrics.

16. A system comprising:
one or more computers and one or more storage devices on which are stored instructions that are operable, when executed by the one or more computers, to cause the one or more computers to perform operations comprising:
identifying, by a component controller, a plurality of running software components deployed on a cluster of computing nodes, the component controller designating each component, according to a respective component configuration, to operate on one or more respective nodes within the cluster to process a workload specified by a workload specification, the plurality of running software components including two or more of a Hadoop Distributed File System, a Hive database access layer, an HBase database management system, or a YARN resource manager,
wherein the workload specification specifies the workload as multiple workload operations to be processed,
wherein the workload specification includes multiple parameters that specify, for each workload operation in the workload, one or more respective components that perform one or more respective tasks for the workload operation, and
wherein for each component of the plurality of components, the respective component configuration comprises a respective plurality of parameters that specify a respective quantity the component may use to process the workload of at least the following resources of the one or more respective nodes: storage, processing power, memory, and network and disk input and output operations;
determining, for each identified component, current execution metrics and quantities of the resources being used by the component in processing the workload, and obtaining, from a database, historical execution metrics and quantities of the resources of the one or more respective nodes used by the component when processing previous workloads, wherein the historical execution metrics and quantities of resources comprise quantities and resources for each workload operation represented by the workload specification;
computing, for each workload operation specified by the workload specification, execution metrics for the workload operation from the current and historical quantities used by each component in performing the workload operation, wherein the execution metrics indicate resources used in nodes by the one or more components included in the workload operation;
updating, for each workload operation, execution metrics in the database;
comparing the current and historical execution metrics for the workload operations of the workload to respective value thresholds; and
in response to the comparing, generating one or more modified parameter values for the component configuration of a particular component or for the workload specification or for both, the component configuration and workload with the modified parameter values specifying a more optimum use of resources when performing the workload represented by the workload specification at the nodes in the cluster than when performing the workload represented by the workload specification according to the component configuration and workload specification without the modified parameter values.

17. The system of claim 16, wherein each workload operation specifies one or more components that perform at least one map task and at least one reduce task, wherein the map task assigns portions of the workload to respective nodes in the cluster for parallel processing to generate respective mapped outputs, and wherein the reduce task processes the respective mapped outputs to generate a workload operation output.

18. The system of claim 17, the operations comprising:
for each reduce task of a particular workload operation:
determining from the current and historical execution metrics a number of records inputted to the reduce task of the workload operation and a number of records outputted from the reduce task of the workload operation;
computing a ratio of the number of records inputted to the reduce task of the workload operation to the number of records outputted from the reduce task of the particular workload operation;
determining that the ratio is greater than a value threshold; and in response to determining that the ratio is greater than the value threshold, generating a modified parameter value that causes the component controller to add a combiner that reduces the number of records inputted to the reduce task of the particular workload operation.

19. The system of claim 17, the operations comprising: for a particular workload operation:
   determining from the current and historical execution metrics a size of records outputted from each map task and a size of records outputted from each reduce task;
   determining, for each task, that the respective size of records outputted from the task is greater than a respective value threshold; and
   in response to determining that the respective size of records is greater than the respective value threshold, generating, for the particular workload operation, a modified parameter value that causes the component controller to compress the records outputted from each task.

20. The system of claim 17, the operations comprising: for a particular workload operation:
   determining from the current and historical execution metrics a respective size of records inputted to each map task of the workload operation;
   determining, for each map task, that the respective size of records inputted to the map task for the workload operation is less than a respective value threshold; and
   in response to determining that the respective size of records is less than the respective value threshold, generating a modified parameter value that causes the component controller to split the workload across a fewer number of map tasks.

21. The system of claim 17, the operations comprising: for a particular workload operation that includes multiple map tasks producing mapped outputs processed by multiple reduce tasks of the particular workload operation:
   determining from the current and historical execution metrics an end time of each map task of the workload operation and a start time of each reduce task of the workload operation;
   obtaining a latest end time from the map tasks;
   obtaining an earliest start time from the reduce tasks;
   determining that a difference between the earliest start time from the reduce tasks and the latest end time from the map tasks is greater than a value threshold; and
   in response to determining that the difference is greater than the value threshold, generating a modified parameter value that causes the component controller to configure the reduce tasks of the workload operation to start at a later time.

22. The system of claim 17, the operations comprising: for a particular workload operation:
   determining from the current and historical execution metrics, for each map and each reduce task of the workload operation, a number of spilled records for the task and a number of output records for the task;
   determining, for one or more tasks, that a ratio of the respective number of spilled records for the task to the number of output records for the task is greater than a respective value threshold; and
   in response to determining that the ratio is greater than the respective value threshold, generating a modified parameter value that causes the particular workload operation to increase a respective spill buffer used in the task.

23. The system of claim 17, the operations comprising: for a reduce task of a particular workload operation:
   determining from the current and historical execution metrics a number of input records for the reduce task of the workload operation;
   computing an average number of input records for each reduce task in the workload operation;
   determining that a ratio of the number of input records for the reduce tasks to the average number of input records for each reduce tasks is greater than a value threshold; and
   in response to determining that the ratio is greater than the value threshold, generating a modified parameter value that causes the component controller to normalize input records across each reduce task.

24. The system of claim 17, the operations comprising: for a particular workload operation:
   determining from the current and historical execution metrics, for each map task of the workload operation, a respective first host on which the map task of the workload operation is executed and a respective second host from which data for the map task was accessed;
   computing, across the map tasks, a first number of map tasks having the respective first host being the same as the respective second host;
   determining that a ratio of the first number to a total number of map tasks for the workload operation is less than a value threshold; and
   in response to determining that the ratio is less than the value threshold, generating a modified parameter value that causes the component controller to configure a scheduler to increase locality for the map tasks.

25. The system of claim 17, the operations comprising: for a particular workload operation:
   determining from the current and historical execution metrics, for each map task and each reduce task in the workload operation, a respective submission time and a respective start time;
   determining, for one or more tasks, that a respective difference between a respective start time of the task and a respective submission time of the task is greater than a value threshold; and
   in response to determining that the respective different is greater than the value threshold, generating a modified parameter value that causes the component controller to reduce a total number of tasks in the workload operation.

26. The system of claim 17, the operations comprising: for a particular workload operation:
   determining from the current and historical execution metrics, for each map task and each reduce task, respective resources blocked by the task and respective resources used by the task;
   determining, for each map task or each reduce task, that a respective difference between the respective resources blocked by the task and the respective resources used by the task is greater than a value threshold; and
   in response to determining that the respective difference is greater than the value threshold, generating a modified parameter value that causes the component controller to lower an amount of resources requested by the particular workload operation.

27. The system of claim 17, wherein the modified parameter values include one or more values that affect an operating system layer of the cluster, the modified parameter values comprising values of parameters affecting kernel configuration, memory usage, processing usage, storage usage, network usage, or dependency usage of the one or more nodes in the cluster; and the modified parameter values include one or more values that affect a storage layer of the cluster, the modified parameter values comprising values of parameters affecting storage type or storage speed of the one or more nodes in the cluster.

28. The system of claim 17, wherein the modified parameters affect a processing layer of the cluster, the modified parameter values comprising values of parameters affecting queue configurations, resource allocations, or container sizes and thresholds of the one or more nodes in the cluster.

29. The system of claim 17, wherein the value thresholds are established by a rules engine, wherein the rules engine is configured to manage, through a user interface, value thresholds corresponding to execution metrics.

30. A method, comprising:

identifying, by a component controller, a plurality of running software components deployed on a cluster of computing nodes, the component controller designating each component, according to a respective component configuration, to operate on one or more respective nodes within the cluster to process a workload specified by a workload specification, the plurality of running software components including two or more of a Hadoop Distributed File System, a Hive database access layer, an HBase database management system, or a YARN resource manager, wherein the workload specification specifies the workload as multiple workload operations to be processed, wherein the workload specification includes multiple parameters that specify, for each workload operation in the workload, one or more respective components that perform one or more respective tasks for the workload operation, and wherein for each component of the plurality of components, the respective component configuration comprises a respective plurality of parameters that specify a respective quantity the component may use to process the workload of at least the following resources of the one or more respective nodes: storage, processing power, memory, and network and disk input and output operations;

determining, for each identified component, current execution metrics and quantities of the resources being used by the component in processing the workload, and obtaining, from a database, historical execution metrics and quantities of the resources of the one or more respective nodes used by the component when processing previous workloads, wherein the historical execution metrics and quantities of resources comprise quantities and resources for each workload operation represented by the workload specification;

computing, for each workload operation specified by the workload specification, execution metrics for the workload operation from the current and historical quantities used by each component in performing the workload operation, wherein the execution metrics indicate resources used in nodes by the one or more components included in the workload operation;

updating, for each workload operation, execution metrics in the database;

comparing the current and historical execution metrics for the workload operations of the workload to respective value thresholds; and in response to the comparing, generating one or more modified parameter values for the component configuration of a particular component or for the workload specification or for both, the component configuration and workload with the modified parameter values specifying a more optimum use of resources when performing the workload represented by the workload specification at the nodes in the cluster than when performing the workload represented by the workload specification according to the component configuration and workload specification without the modified parameter values.

* * * * *